(12) United States Patent
Tanaka

(10) Patent No.: US 8,976,380 B2
(45) Date of Patent: Mar. 10, 2015

(54) IMAGE FORMING APPARATUS THAT SHIFTS TO DIFFERENT POWER STATE, METHOD OF CONTROLLING THE SAME, AND STORAGE MEDIUM

(71) Applicant: Canon Kabushiki Kaisha, Tokyo (JP)

(72) Inventor: Yasutomo Tanaka, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/053,679

(22) Filed: Oct. 15, 2013

(65) Prior Publication Data

US 2014/0104634 A1 Apr. 17, 2014

(30) Foreign Application Priority Data

Oct. 16, 2012 (JP) ................................. 2012-228803

(51) Int. Cl.
| | |
|---|---|
| *G06F 3/12* | (2006.01) |
| *G06K 15/00* | (2006.01) |
| *B41J 29/38* | (2006.01) |
| *H04N 1/00* | (2006.01) |

(52) U.S. Cl.
CPC ............. *G06K 15/4055* (2013.01); *B41J 29/38* (2013.01); *H04N 1/00* (2013.01); *H04N 1/00904* (2013.01)

USPC ......................................... 358/1.13; 358/1.14

(58) Field of Classification Search
USPC .......... 358/1.13, 1.14, 1.16, 1.15; 399/70, 77, 399/82, 85, 88
See application file for complete search history.

(56) References Cited

FOREIGN PATENT DOCUMENTS

| | | |
|---|---|---|
| JP | 09-034578 A | 2/1997 |
| JP | 2000-082014 A | 3/2000 |

*Primary Examiner* — Vu B Hang
(74) *Attorney, Agent, or Firm* — Rossi, Kimms & McDowell LLP (57) ABSTRACT

An image forming apparatus capable of more quickly executing a fail-safe function for shifting to a power state different in power consumption. The apparatus can operate in power states different in power consumption. A controller controls the apparatus. A power supply controller controls supply of power. A reset circuit resets the controller. When a power switch is operated by a user, a monitoring time period, set in advance, is decided according to a type of user's operation and the power state. One of operations to be executed when the monitoring time period has elapsed, for causing the controller to cut off the supply of power to the controller and for causing the reset circuit to reset the controller, is set according to the type of user's operation and the power state. The set operation is executed when the decided monitoring time period has elapsed.

17 Claims, 8 Drawing Sheets

IMAGE FORMING APPARATUS THAT SHIFTS TO DIFFERENT POWER STATE, METHOD OF CONTROLLING THE SAME, AND STORAGE MEDIUM

BACKGROUND OF THE INVENTION

1. Field of the Invention

The present invention relates to an image forming apparatus that shifts to a different power state, a method of controlling the same, and a storage medium.

2. Description of the Related Art

Recent image forming apparatuses tend to be increased in time required for activation. A factor as one of the causes for this is that the size of data to be loaded from a ROM into a RAM during activation of each apparatus has been increased due to increased functionality of the apparatus.

To solve this problem, there has been proposed a technique for holding data stored in the RAM when the user turns off the power switch, and reducing time required for activation by omitting processing for loading the data from the ROM into the RAM when the user turns on the power switch next time.

Further, there has been proposed a technique called "suspend" for holding data stored in the RAM by continuing the supply of power to the RAM (see e.g. Japanese Patent Laid-Open Publication No. H09-34578).

Also, there has been proposed a technique called "hibernation" for holding data stored in the RAM by temporarily saving the data stored in the RAM in a HDD (see e.g. Japanese Patent Laid-Open Publication No. 2000-82014). In this technique, even though it appears to a user that the apparatus is completely powered off, it is possible to reduce the time required for activation.

Recent image forming apparatuses carry out power supply control responsive to a user's operation on the power switch using software. Conventional image forming apparatuses are configured such that the supply and cutoff of power are electrically switched according to the operation of the power switch, such as a rocker switch, and hence it has not been required to carry out the power supply control by software processing.

In recent years, there is a demand for enabling the powering on or off of an image forming apparatus via a network, and to meet this demand, an increasing number of image forming apparatuses employ a tactile switch.

In an image forming apparatus provided with a tactile switch, the power is switched on or off using software such that when the tactile switch is depressed in a power-off state, a signal is generated and input to a power control circuit to turn on the power, whereas when the switch is depressed in a power-on state, a signal is similarly generated and input to the power control circuit to turn off the power.

Further, the image forming apparatuses that perform power supply control responsive to a power switch operation using software have a timer-power-off function for electrically shutting down the power supply to a controller when a predetermined time elapses after a power-off operation has been detected, as a safety measure for software runaway.

This function guarantees prevention of a situation where the power cannot be switched off, even when software runaway occurs.

In a case where the image forming apparatus is configured to continue the supply of power to the RAM of the controller against the power-off operation so as to reduce the time required to execute power-on startup of the image forming apparatus, it is necessary to make the image forming apparatus appear to the user as if it were in the power-off state even though power is being supplied to the RAM.

To this end, the image forming apparatus is placed in a quick activation standby state in which the supply of power to at least a printer engine is interrupted and power used by units within the controller other than the RAM is saved as much as possible. That is, if the power switch is depressed during a standby state, the image forming apparatus shifts to the quick activation standby state, and if the power switch is depressed during the quick activation standby state, the image forming apparatus shifts to the standby state.

During the quick activation standby state, a CPU that controls on/off of the power is in an energized state, and hence there is a possibility that if the CPU runs away due to some reason, power control firmware does not normally operate, preventing the image forming apparatus from returning to the standby state even when the power switch is depressed.

In this case as well, the above-described timer-power-off function makes it possible to forcibly and electrically shut down the power supply to the controller.

However, in a case where the power switch is depressed during the quick activation standby state, the user intends to activate the image forming apparatus. In this case, if the above-described timer-power-off function is operated, even though the user intends to activate the image forming apparatus, the power supply to the controller is electrically shut down, causing the image forming apparatus to shift to the power-off state.

In such a case, the user is required, after confirming that the image forming apparatus has shifted to the power-off state, to depress the power switch again to thereby start up the image forming apparatus, which is undesirable to the user.

Further, time taken to shift the power supply state is sometimes different depending on a shifting process. For example, a shifting time period required to shift the power supply state from the standby state to the quick activation standby state and a shifting time period required to shift the same from the quick activation standby state to the standby state are often different from each other.

For this reason, if a monitoring time period to elapse before the timer function is operated is uniformly set, in a case where there are a plurality of power state-shifting processes which are different in shifting time period, it is impossible to set a proper monitoring time period according to each power state.

For example, assuming that the monitoring time period is reduced in a manner adjusted to a power state-shifting process which requires a short shifting time period, when a power state-shifting process which requires a long shifting time period is executed, the timer function is executed even though the power state-shifting process is being normally executed.

On the other hand, assuming that the monitoring time period is increased in a manner adjusted to a power state-shifting process which requires a long shifting time period, when a power state-shifting process which requires a short shifting time period is executed, in case this power state-shifting process is stopped in the middle of execution thereof, it takes a longer time than necessary before the timer function is executed.

SUMMARY OF THE INVENTION

The present invention provides an image forming apparatus that is capable of more quickly executing a fail-safe function for shifting to a power state which is different in power consumption, a method of controlling the same, and a storage medium.

In a first aspect of the present invention, there is provided an image forming apparatus that is capable of operating in a plurality of power states which are different in power consumption, and includes a switch operated by a user so as to switch an actual power state between the plurality of power states, comprising a main control unit configured to control the image forming apparatus, a power supply control unit configured to control supply of power to the main control unit, a reset unit configured to reset the main control unit, a deciding unit configured to decide, when the switch is operated by the user, a monitoring time period, set in advance, according to a type of user's operation and the actual power state, a setting unit configured to set, according to the type of user's operation and the actual power state, one of respective operations to be executed when the monitoring time period has elapsed, for causing the main control unit to interrupt the supply of power to the main control unit and for causing the reset unit to reset the main control unit, and an operation execution unit configured to execute the operation set by the setting unit when the monitoring time period decided by the deciding unit has elapsed from when the switch is operated by the user, in a state executing a process started in response to operation of the switch by the user, for changing the actual power state.

In a second aspect of the present invention, there is provided a method of controlling an image forming apparatus that is capable of operating in a plurality of power states which are different in power consumption, and includes a switch operated by a user so as to switch an actual power state between the plurality of power states, a main control unit configured to control the image forming apparatus, a power supply control unit configured to control supply of power to the main control unit, and a reset unit configured to reset the main control unit, the method comprising deciding, when the switch is operated by the user, a monitoring time period, set in advance, according to a type of user's operation and the actual power state, setting, according to the type of user's operation and the actual power state, one of respective operations to be executed when the monitoring time period has elapsed, for causing the main control unit to interrupt the supply of power to the main control unit and for causing the reset unit to reset the main control unit, and executing the operation set by said setting when the monitoring time period decided by said deciding has elapsed from when the switch is operated by the user, in a state executing a process started in response to operation of the switch by the user, for changing the actual power state.

In a third aspect of the present invention, there is provided an non-transitory computer-readable storage medium storing a computer-executable control program for causing a computer to execute a method of controlling an image forming apparatus that is capable of operating in a plurality of power states which are different in power consumption, and includes a switch operated by a user so as to switch an actual power state between the plurality of power states, a main control unit configured to control the image forming apparatus, a power supply control unit configured to control supply of power to the main control unit, and a reset unit configured to reset the main control unit, wherein the method comprises deciding, when the switch is operated by the user, a monitoring time period, set in advance, according to a type of user's operation and the actual power state, setting, according to the type of user's operation and the actual power state, one of respective operations to be executed when the monitoring time period has elapsed, for causing the main control unit to interrupt the supply of power to the main control unit and for causing the reset unit to reset the main control unit, and executing the operation set by said setting when the monitoring time period decided by said deciding has elapsed from when the switch is operated by the user, in a state executing a process started in response to operation of the switch by the user, for changing the actual power state.

According to the present invention, it is possible to provide an image forming apparatus that is capable of more quickly executing a fail-safe function for shifting to a power state which is different in power consumption, a method of controlling the same, and a storage medium.

Further features of the present invention will become apparent from the following description of exemplary embodiments with reference to the attached drawings.

BRIEF DESCRIPTION OF THE DRAWINGS

FIGS. 5A to 5D are diagrams showing power supply states of the image forming apparatus shown in FIG. 1, in which FIG. 5A shows a power-on state, FIG. 5B shows a power-off state, FIG. 5C shows a power saving state, and FIG. 5D shows a quick activation standby state of the image forming apparatus.

DESCRIPTION OF THE EMBODIMENTS

The present invention will now be described in detail below with reference to the accompanying drawings showing embodiments thereof.

Figure 1:
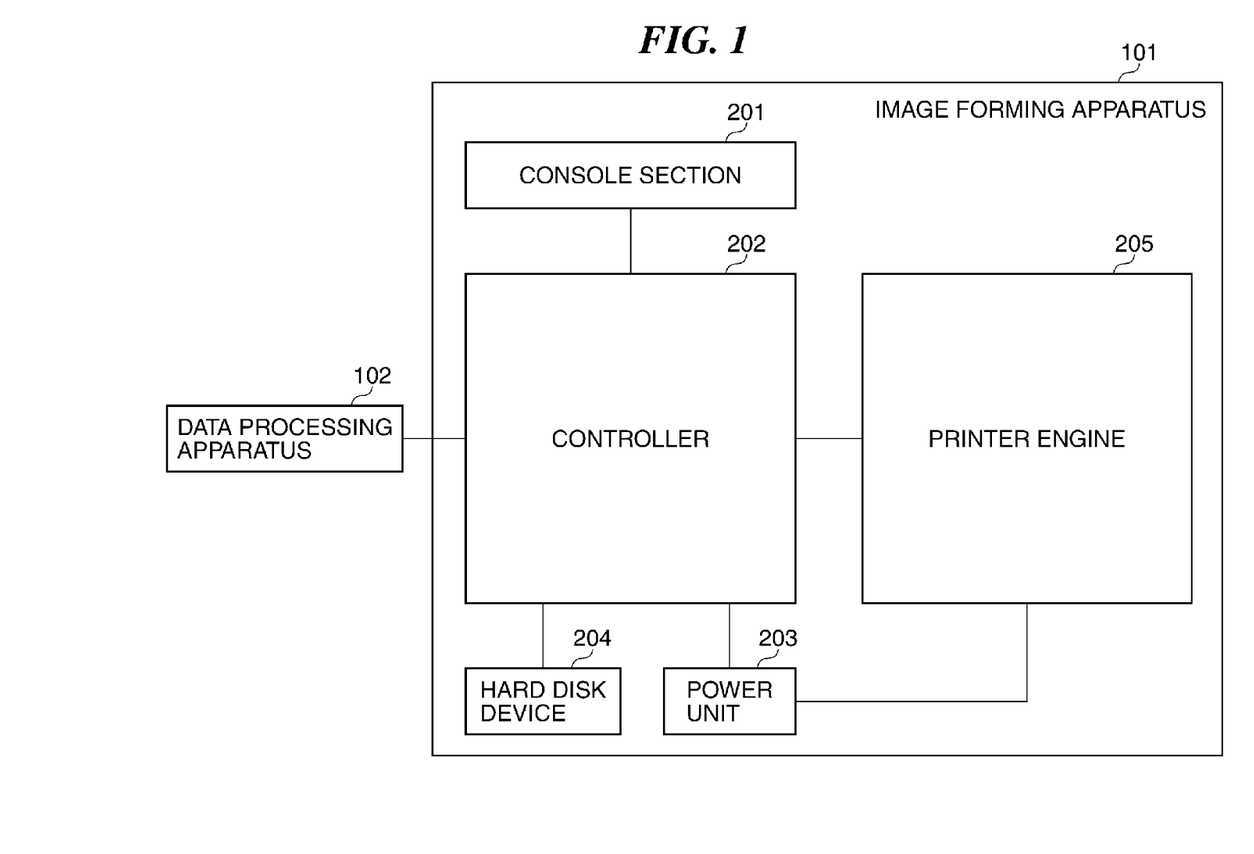
FIG. 1 is a schematic block diagram of an image forming apparatus according to an embodiment of the present invention.

FIG. 1 is a schematic block diagram of an image forming apparatus 101 according to an embodiment of the present invention.

Referring to FIG. 1, the image forming apparatus 101 comprises a controller 202, a console section 201, a hard disk device 204, a power unit 203, and a printer engine 205.

The controller 202 controls the overall operation of the image forming apparatus 101. The printer engine 205 forms a digital image on a sheet according to image information shared by the controller 202.

The console section 201 is used by a user for operating the image forming apparatus 101. Further, the console section 201 includes operation buttons, not shown, for the user to configure the settings of the image forming apparatus 101, and a display panel, such as a liquid crystal screen, as a display section for providing various information of the image forming apparatus 101 to the user.

The hard disk device 204 stores digital images, resource information used in generating the digital images, and so on. The hard disk device 204 may be replaced by any other suitable storage device, such as a SSD.

The power unit 203 is connected to an AC power supply, and supplies power to the units of the image forming apparatus 101.

A data processing apparatus 102, which is e.g. a computer, issues a print job and provides instructions for operating devices, to the image forming apparatus 101 from a communication interface, not shown, for a LAN, not shown, or the like.

Figure 2:
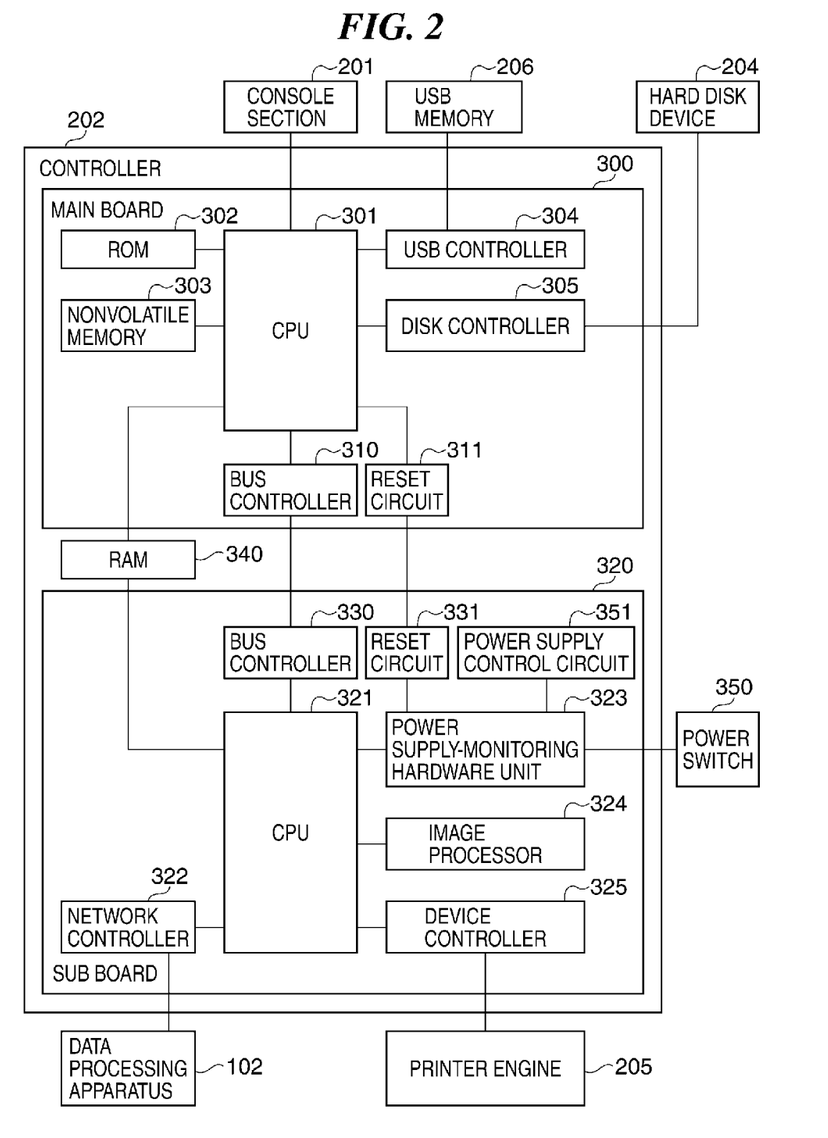
FIG. 2 is a schematic block diagram of a controller appearing in FIG. 1.

FIG. 2 is a schematic block diagram of the controller 202 appearing in FIG. 1.

Referring to FIG. 2, the controller 202 includes a main board 300 and a sub board 320.

The main board 300 is a general-purpose CPU system, and is configured as follows: A CPU 301 corresponds to a main control unit configured to control the image forming apparatus 101, and controls the overall operation of the main board 300. A ROM 302 stores programs executed by the CPU 301 and a CPU 321. Programs for executing processes, described hereinafter, are also stored in the ROM 302.

A nonvolatile memory 303 stores setting information of the image forming apparatus 101 and counter information concerning printing, and holds the stored information even after the supply of power is cut off. A USB controller 304 controls inputting and outputting of data to and from a USB memory 206. The USB memory 206 stores various data to be used by the image forming apparatus 101.

A disk controller 305 controls inputting and outputting of data to and from the hard disk device 204. A bus controller 310 has a function for bridging between the same and a bus controller 330 of the sub board 320. A reset circuit 311 resets the settings of hardware of the main board 300. This causes the CPU 301 to be reset, and hence the reset circuit 311 corresponds to a reset unit configured to reset the main control unit.

Next, the sub board 320 will be described. The sub board 320 comprises a relatively small general-purpose CPU system and image processing hardware, and is configured as described hereafter.

The CPU 321 controls the overall operation of the sub board 320. A network controller 322 performs inputting and outputting of data to and from the data processing apparatus 102 via the LAN.

A power supply control circuit 351 is a circuit for controlling supply of power to the controller 202, and corresponds to a power supply control unit configured to control supply of power to the main control unit. A power supply-monitoring hardware unit 323 monitors power supply control for the image forming apparatus 101, and is capable of resetting a reset circuit 311 and the system via the reset circuit 331 according to instructions from the CPU 321 in a case where the CPU 321 is normally operable.

Further, the power supply-monitoring hardware unit 323 is capable of powering on the controller 202 according to depression of a power switch 350 in a state where power is not supplied to the CPU 321. The power switch 350 is operated by the user for changing between power states, described hereinafter.

The power supply control circuit 351 controls supply of power to the controller 202 under the control of the power supply-monitoring hardware unit 323. The reset circuit 331 resets the settings of the hardware of the sub board 320.

An image processor 324 performs real-time digital image processing. A device controller 325 controls the printer engine 205. The bus controller 330 has a function for bridging between the same and the bus controller 310 of the main board 300.

Besides these, the controller 202 includes a RAM 340. The RAM 340 can be accessed from each of the CPU 301 and the CPU 321, and is used as a main storage memory therefor.

The CPU 301 reads out respective main programs for the CPU 301 and the CPU 321 from the ROM 302 according to an initial program stored in the ROM 302 and loaded therefrom into the RAM 340, and loads the read main programs into the RAM 340.

The power switch 350 is used by the user for giving a power-on or power-off instruction, and is connected to the power supply-monitoring hardware unit 323.

Although the above-described CPU 301 and the CPU 321 include many CPU-peripheral hardware components, such as a chip set, a bus bridge, a clock generator, and so on, they are omitted from illustration in FIG. 2.

Figure 3:
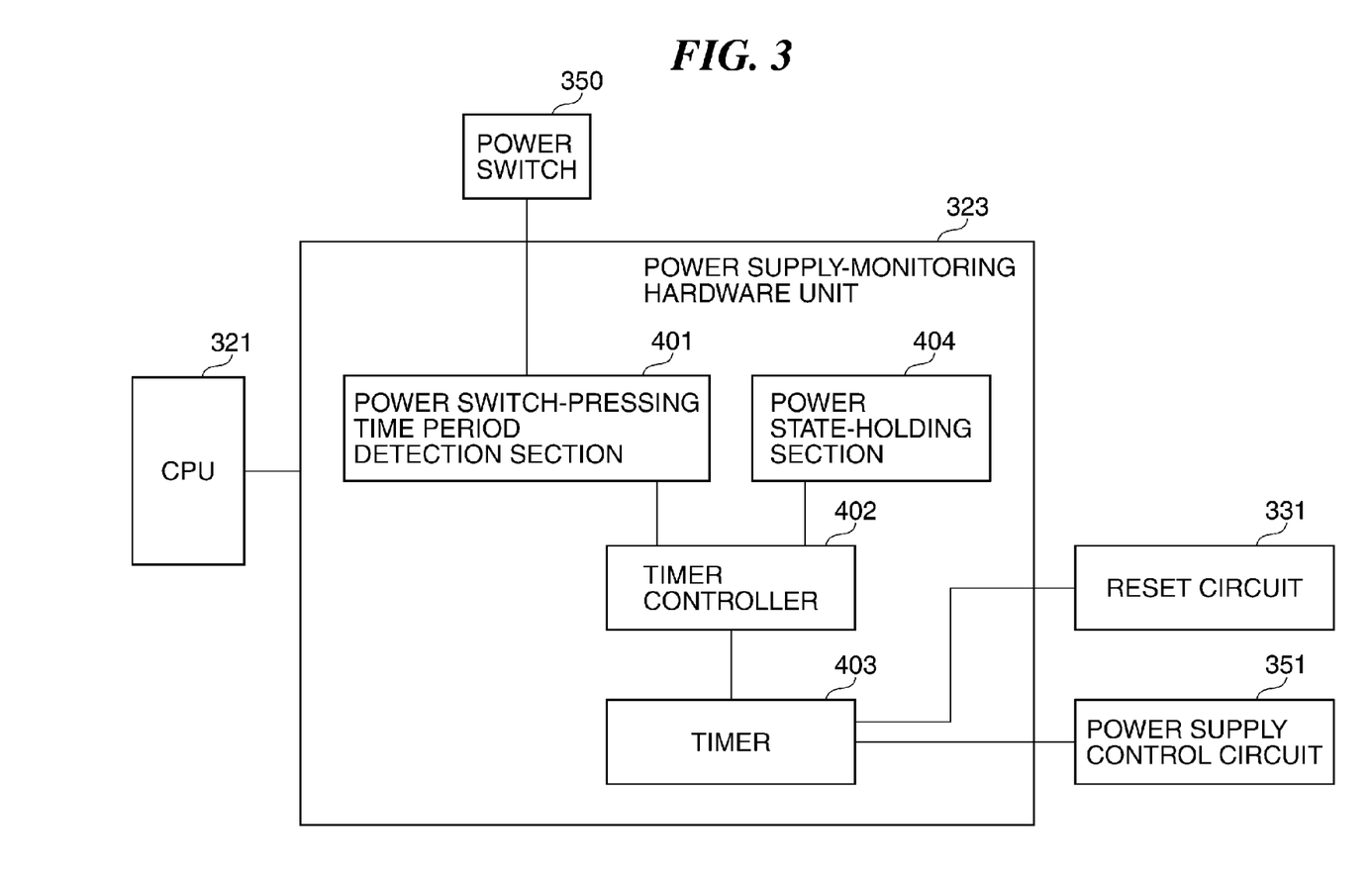
FIG. 3 is a schematic block diagram of a power supply-monitoring hardware unit appearing in FIG. 2.

FIG. 3 is a schematic block diagram of the power supply-monitoring hardware unit 323 appearing in FIG. 2.

Referring to FIG. 3, the power supply-monitoring hardware unit 323 comprises a power switch-pressing time period detection section 401, a timer controller 402, a timer 403, and a power state-holding section 404.

The power switch-pressing time period detection section 401 detects depression of the power switch 350, detects a time period over which the power switch 350 continues to be depressed, and notifies the CPU 321 of the detected time period of depression of the power switch 350. The power state-holding section 404 holds information on the power supply state of the controller 202.

The timer 403 counts a time period over which a power state-shifting process is executed, and operates according to the measured time period. The timer 403 operates under the control of the timer controller 402, and is used for resetting the CPU 321 via the reset circuit 331, and interrupting the supply of power to the controller 202 via the power supply control circuit 351.

The timer controller 402 controls the timer 403, decides a monitoring time period for monitoring the power state-shifting process executed by the controller 202, and further sets a process to be executed in a case where the power state-shifting process is not completed within the monitoring time period.

Figure 4:
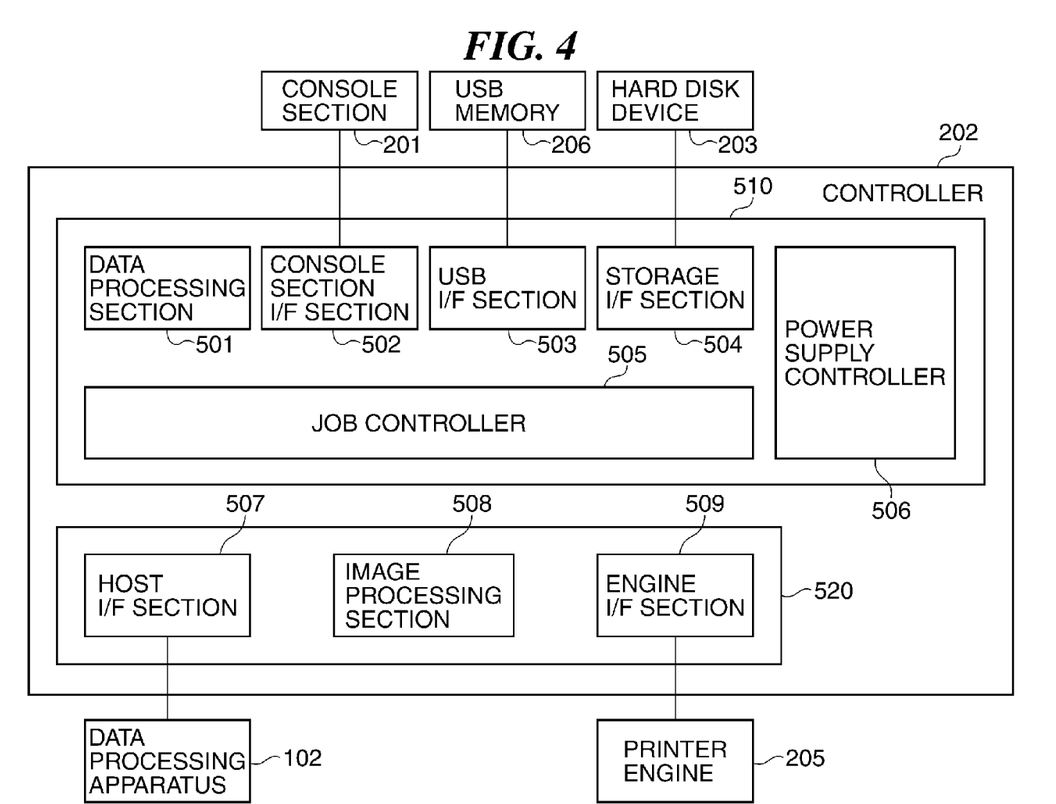
FIG. 4 is a schematic block diagram showing the software configuration of the controller appearing in FIG. 1.

FIG. 4 is a schematic block diagram showing the software configuration of the controller 202 appearing in FIG. 1.

Referring to FIG. 4, the software of the controller 202 comprises a block 510 executed by the CPU 301, and a block 520 executed by the CPU 321.

The block 510 includes a data processing section 501, a console section interface section 502, a USB interface section 503, a storage interface section 504, a job controller 505, and a power supply controller 506.

The console section interface section 502 is a software module that provides an input unit for use in inputting information for configuring the image forming apparatus 101, and a display unit for displaying information on the image forming apparatus 101, to the user via the console section 201.

The USB interface section 503 is a software module that reads image files stored in the USB memory 206, and receives from the user via the console section interface section 502 a print instruction for printing a selected one of the image files to thereby register the pint instruction in the job controller 505 as a print job.

The storage interface section 504 is a software module that interfaces the hard disk device 204, for accessing the hard disk device 204 to store print data therein when a job received via a host interface section 507 turns out to be a storage job as a result of data interpretation by the data processing section 501, and for reading out the stored print data when a print instruction for printing the storage job is received from the user via the console section 201.

The job controller 505 is a software module that receives a request from each of the software modules for execution of registering, deleting, stopping, resuming, etc. of a job, and provides a operating instruction to an associated software module according to the contents of the job.

The power supply controller 506 is a software module that performs control for switching to each power supply state according to a power switch operation and power saving settings. The power saving settings will be described hereinafter. Further, the power supply controller 506 is a software module that controls the power supply-monitoring hardware unit 323.

On the other hand, the block 520 includes the host interface section 507, an image processing section 508, and an engine interface section 509.

The host interface section 507 is a software module that receives print data sent from the data processing apparatus 102, and stores the received print data in the RAM 340.

The data processing section 501 reads out the received data stored by the host interface section 507 from the RAM 340, interprets the read data, and sends the same to the job controller 505, and the job controller 505 registers the received data as a job. Further, the data processing section 501 is a software module that converts the received data into intermediate data, and stores the converted data in the RAM 340.

The image processing section 508 is a software module that reads out the intermediate data stored by the data processing section 501 from the RAM 340, and stores the read intermediate data in the RAM 340 as bitmap data via the image processor 324.

The engine interface section 509 is a software module that instructs, after the image processing section 508 has stored the bitmap data in the RAM 340, the printer engine 205 to print the bitmap data.

Further, the engine interface section 509 is a software module that monitors the state of the printer engine 205, and notifies the data processing apparatus 102 etc. of the state of the printer engine, on an as-needed basis, via the host interface section 507.

When printing, the engine interface section 509 issues a print request command to the printer engine 205, and notifies the image processor 324 of a location of the bitmap data stored in the RAM 340.

Thereafter, the engine interface section 509 transfers the bitmap data stored in the RAM 340 to the printer engine 205 via the image processor 324 and the device controller 325 according to an image transfer synchronization signal sent from the printer engine 205.

The above-described image forming apparatus 101 has image forming functions described hereafter.

First, the CPU 321 receives print data e.g. in page description language sent from the data processing apparatus 102, and stores the received print data in the RAM 340. After confirming that the CPU 321 has received the print data, the CPU 301 analyzes the page description language, and stores the print data in the RAM 340 as intermediate data which the image processor 324 can convert to bitmap data.

After confirming the generation of the intermediate data, the CPU 321 inputs the intermediate data read from the RAM 340 to the image processor 324, and the image processor 324 outputs the bitmap data to the RAM 340 via the CPU 321.

The CPU 321 sends a print request to the printer engine 205 via the device controller 325 according to generation of the bitmap data, and notifies the image processor 324 of a location of the bitmap data stored in the RAM 340.

The CPU 321 transmits the image data stored in the RAM 340 to the printer engine 205 via the image processor 324 and the device controller 325 according to the image transfer synchronization signal sent from the printer engine 250.

The printer engine 205 forms an image on a sheet based on the digital image data transferred by the controller 202 according to a predetermined electrophotographic process.

The image forming apparatus 101 further has various functions. Out of the various functions, a login function is for receiving an input of a user ID and a password associated with each person as an individual user, via the console section 201, and accepting an input of each of various jobs only when authentication of the individual user is successful. The security is improved by recording history of users and executed jobs as a history.

The image forming apparatus 101 is capable of changing a setting for each of the various functions as to whether to enable or disable the function. The display panel of the console section 201 is configured to be capable of displaying various setting screens, and the user can select enabling or disabling each of the above-mentioned functions from an associated one of the setting screens.

Further, the image forming apparatus 101 has a function of displaying a normal screen, a login screen, a user mode screen, and a service mode screen on the display panel of the console section 201. These screens are configured to be switched on an as-needed basis when the user performs a predetermined operation.

The normal screen is displayed on the console section 201 in a normal state, and when the normal screen is displayed, the image forming apparatus 101 receives instructions for executing various jobs via the operation buttons provided on the console section 201. Further, when a predetermined user's operation is received, the image forming apparatus 101 changes the screen to the user mode screen.

The login screen is displayed when the above-mentioned login function is set to be enabled. When the login screen is displayed, the image forming apparatus 101 receives inputs of a user ID and a password via the operation buttons of the console section 201. If a user ID and a password input by the user are valid, the screen displayed on the console section 201 is switched to the normal screen.

The user mode screen is a setting screen via which general users can change the settings of setting items except special setting items which can be configured only by service technicians. Although in general image forming apparatuses, the user mode screen is often simply called a setting screen, in this example, it is referred to as the user mode screen so as to clearly distinguish the user mode screen from the service mode screen. Via the user mode screen, the user can set enabling or disabling of an activation time-reducing function and the login function.

The service mode screen enables service technicians to adjust the operation of the image forming apparatus 101, and change the settings of the special setting items.

Figure 5A:
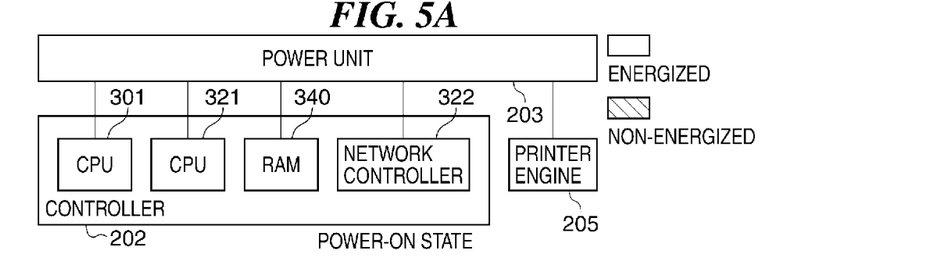
Figure 5B:
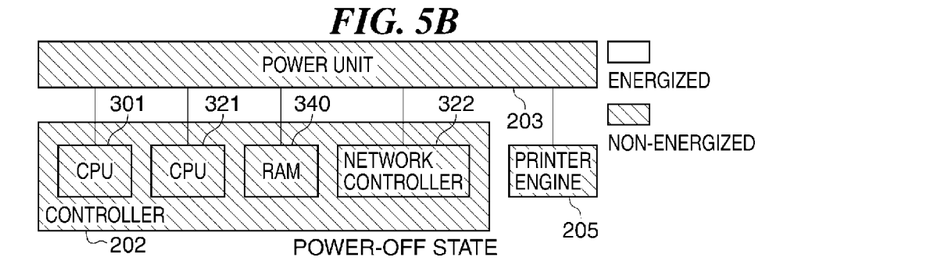
Figure 5C:
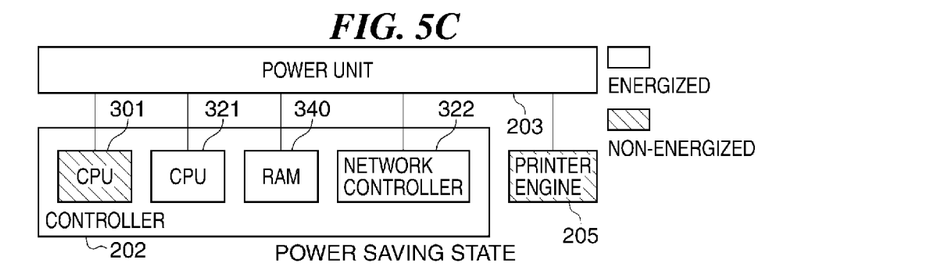
Figure 5D:
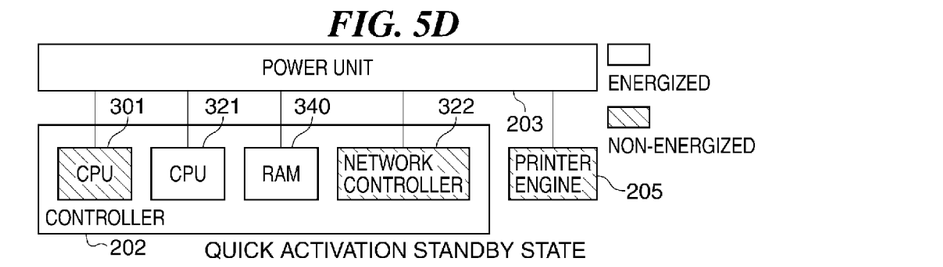

FIGS. 5A to 5D are diagrams showing power supply states (power states) of the image forming apparatus 101 shown in FIG. 1, in which FIG. 5A shows a power-on state, FIG. 5B shows a power-off state, FIG. 5C shows a power saving state, and FIG. 5D shows a quick activation standby state.

Note that in the following description, interruption of the supply of power includes not only a state in which the supply of power is reduced to 0, but also a state in which the supply of power is executed with such a very small amount of electric power as will not cause a component to which the power is supplied to normally operate.

Referring to FIG. 5A, the power-on state is an example of a first power state. In this mode, electric power is supplied to the component units of the image forming apparatus 101.

When a predetermined time elapses without executing any function in the power-on state, the image forming apparatus 101 shifts to the power saving state shown in FIG. 5C.

Further, when a power-off operation by depressing the power switch 350 is performed in the power-on state, the image forming apparatus 101 shifts to the power-off state shown in FIG. 5B under a predetermined condition.

Cases where the image forming apparatus 101 shifts to the power-off state shown in FIG. 5B may include a case of execution of a long press of the power switch 350, which is an operation for depressing the power switch 350 for a predetermined operation time period or longer. Further, when the power-off operation by depressing the power switch 350 is performed in the power-on state, the image forming apparatus 101 shifts to the quick activation standby state shown in FIG. 5D, under a predetermined condition.

Note that an operation for pressing the switch for less than the predetermined operation time period is called a short press.

In the power-off state shown in FIG. 5B, supply of power to the component units of the image forming apparatus 101 is stopped. When the power-on operation by depressing the power switch 350 is performed in the power-off state, the image forming apparatus 101 shifts to the power-on state shown in FIG. 5A. At this time, the respective main programs for the CPU 301 and the CPU 321 are read out from the ROM 302 and are loaded into the RAM 340, and hence it takes a longer time period to complete activation than to complete activation from the quick activation standby state shown in FIG. 5D.

In the power saving state shown in FIG. 5C, the supply of power to the CPU 321, the RAM 340, the network controller 322, and the power unit 203 (not shown in FIG. 5A to FIG. 5D) is maintained, and the supply of power to the other components is interrupted.

If data is input to the network controller 322, or a user depresses a power save cancel button, not shown, on the console section 201 in this power saving state, the image forming apparatus 101 shifts to the power-on state shown in FIG. 5A.

Further, when the power-off operation by depressing the power switch 350 is performed in the power saving state, the image forming apparatus 101 shifts to the power-off state shown in FIG. 5B under a predetermined condition. Cases where the image forming apparatus 101 shifts to the power-off state shown in FIG. 5B may include a case of execution of the aforementioned long press of the power switch 350. Further, when the power-off operation by depressing the power switch 350 is performed in the power saving state, the image forming apparatus 101 shifts to the quick activation standby state shown in FIG. 5D, under a predetermined condition.

The quick activation standby state shown in FIG. 5D is an example of a second power state. In this state, the supply of power to the CPU 321, the RAM 340, and the power unit 203 is maintained, and the supply of power to the other components is interrupted.

When the power-on operation by depressing the power switch 350 is performed in the quick activation standby state, the image forming apparatus 101 shifts to the power-on state shown in FIG. 5A. At this time, the CPU 301 uses the main program which has been loaded into the RAM 340, and hence it takes a shorter time to complete activation than to complete activation from the power-off state shown in FIG. 5B. The power consumption in the quick activation standby state is higher than that in the power-off state shown in FIG. 5B, and is lower than that in the power saving state shown in FIG. 5C.

The image forming apparatus 101 may be configured to shift to the power-off state shown in FIG. 5B when the aforementioned long press of the power switch 350 is performed in the quick activation standby state.

The above-described power supply states in the decreasing order of power consumption are the power-on state, the power saving state, the quick activation standby state, and the power-off state.

On the other hand, the above-described power supply states in the decreasing order of the speed of shift to the power-on state are the power saving state, the quick activation standby state, and the power-off state.

As described above, the image forming apparatus 101 is capable of operating in the plurality of power states different in power consumption. Further, the plurality of power states include the first power state, the second power state which is lower in power consumption than the first power state, and the power-off state in which the supply of power is cut off. Further, types of user's operation include the short press for pressing the switch for less than the predetermined operation time period, and the long press for depressing the switch for more than the predetermined operation time period.

Figure 6:
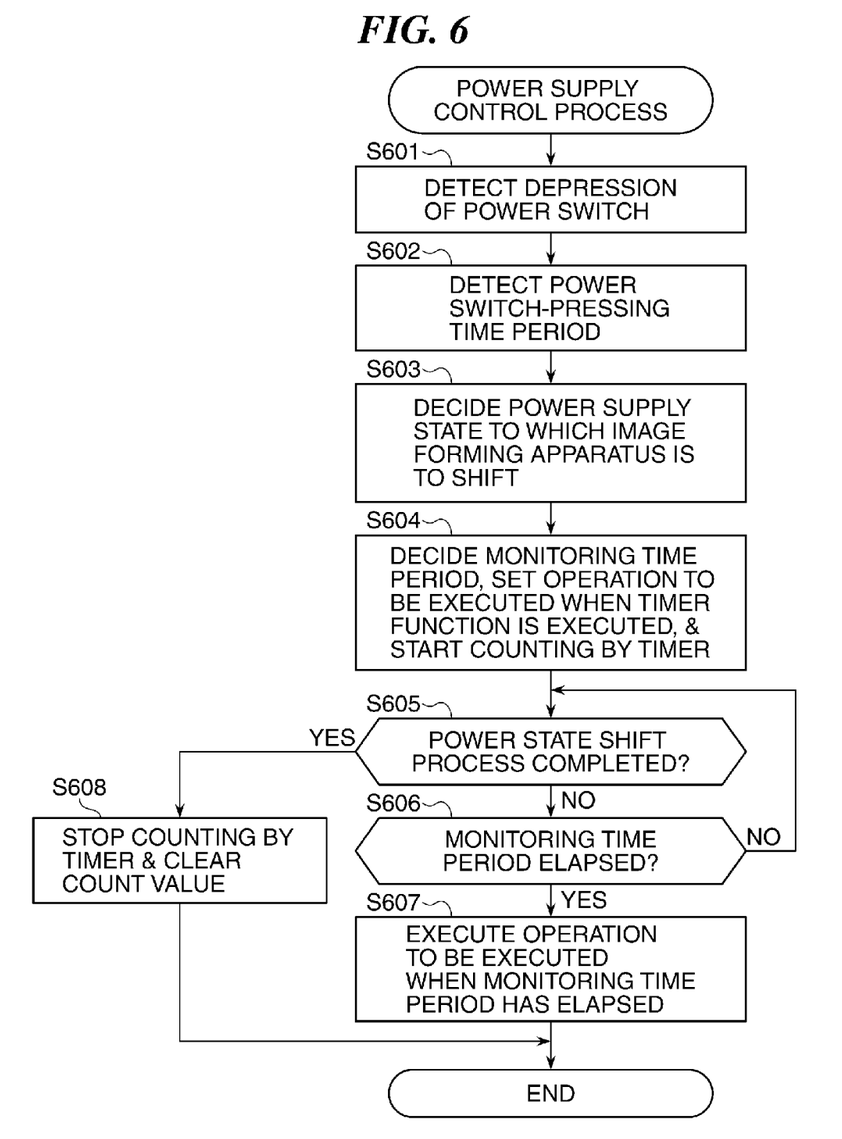
FIG. 6 is a flowchart of a power supply control process executed by a CPU appearing in FIG. 2.

FIG. 6 is a flowchart of a power supply control process executed by the CPU 301 appearing in FIG. 2.

Note that steps of the power control process described hereafter are executed by the CPU 301 executing the main programs loaded into the RAM 340.

Referring to FIG. 6, the power supply controller 506, first, detects depression of the power switch 350 via the power switch-pressing time period detection section 401 (step S601), and detects a pressing time period over which the power switch 350 is depressed (Step S602). It is determined here, based on the detected pressing time period, whether the user's operation is the long press or the short press of the power switch 350.

Then, the power supply controller 506 decides the power supply state to which the image forming apparatus 101 is to shift next, according to the power switch-pressing time period and the power supply state of the controller 202 held by the power state-holding section 404 (step S603).

Then, the power supply controller 506 decides a monitoring time period over which a time period required to shift the power state is to be monitored, sets an operation to be performed in a case where the power state-shifting process is not completed within the monitoring time period, and causes the timer 403 to start counting of the monitoring time period (step S604). When the power state shift is completed, the power supply controller 506 notifies the timer controller of completion of the power state-shifting process. The step S604 corresponds to a function of a deciding unit configured to decide, when the switch is operated by the user, a monitoring time period, set in advance, according to a type of user's operation and a power state. The step S604 further corresponds to a function of a setting unit configured to set, according to the type of user's operation and the power state, one of respective operations to be executed when the monitoring time period has elapsed, for causing the main control unit to interrupt the supply of power to the main control unit and for causing the reset unit to reset the main control unit.

The power supply controller 506 determines whether or not the power state shift to the decided power supply state has been completed (step S605). If it is determined in the step S605 that the power state shift to the decided power supply state has been completed (YES to the step S605), the power supply controller 506 causes the timer 403 to stop counting the monitoring time period, and clears the count value (step S608), followed by terminating the present process. At this time, the power supply controller 506 causes the power state-holding section 404 to hold information on the power supply state of the controller 202.

On the other hand, if it is determined in the step S605 that the power state shift to the decided power supply state has not been completed yet (NO to the step S605), the power supply controller 506 determines whether or not the count value counted by the timer 403 started in the step S604 indicates that the monitoring time period decided in the step S604 has elapsed (step S606).

If it is determined in the step S606 that the monitoring time period has not elapsed (NO to the step S606), the power supply controller 506 returns to the step S605.

On the other hand, if it is determined in the step S606 that the monitoring time period has elapsed (YES to the step S606), the operation to be performed when the timer is operated, which has been set in the step S604, is caused to be executed by the timer 403 (step S607), followed by terminating the present process. The step S607 corresponds to a function of an operation execution unit configured to execute an operation set by the setting unit when a monitoring time period decided by the deciding unit has elapsed from when the switch is operated by a user, in a state executing a process started in response to operation of the switch by the user, for changing the actual power state.

Figure 7:
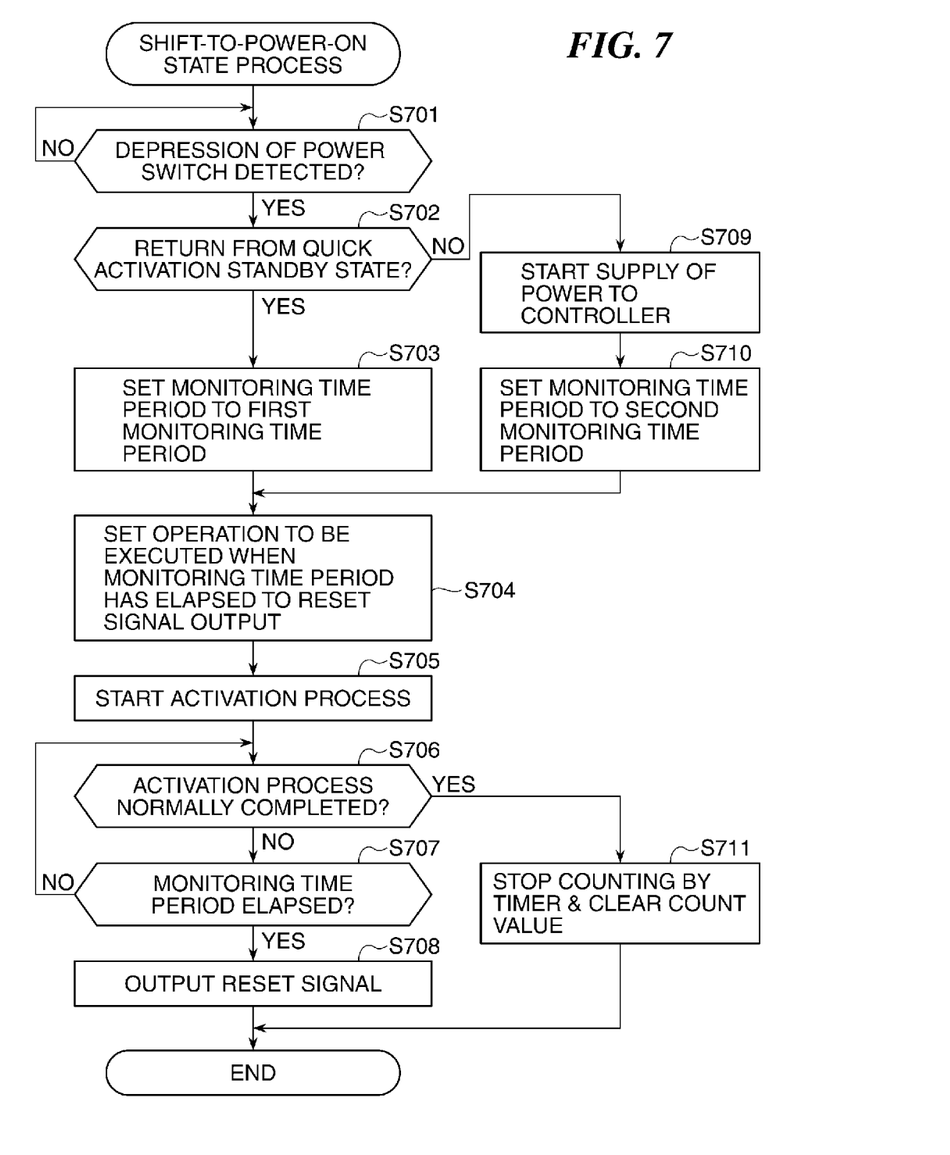
FIG. 7 is a flowchart of a shift-to-power-on state process executed by the CPU appearing in FIG. 2.

FIG. 7 is a flowchart of a shift-to-power-on state process executed by the CPU 301 appearing in FIG. 2.

Referring to FIG. 7, when depression of the power switch 350 is detected in the power-off state (YES to a step S701), the power supply controller 506 determines whether or not a return from the quick activation standby state is to be executed (step S702). In this step, unless the return from the quick activation standby state is to be executed, it is determined that a return from the power-off state is to be executed.

If it is determined in the step S702 that the return from the quick activation standby state is to be executed (YES to the step S702), the power supply controller 506 sets the monitoring time period as a setting for the timer 403 to a first monitoring time period via the timer controller 402 (step S703), and proceeds to a step S704. Here, the first monitoring time period is an appropriate monitoring time period for monitoring the process for shifting the power state from the quick activation standby state to the standby mode.

On the other hand, if it is determined in the step S702 that the return from the quick activation standby state is not to be executed (NO to the step S702), the power supply controller 506 starts the supply of power to the controller 202 (step 709). Then, the power supply controller 506 sets the monitoring time period as a setting for the timer 403 to a second monitoring time period via the timer controller 402 (step S710). Here, the second monitoring time period is an appropriate monitoring time period for monitoring the process for shifting the power state from the power-off state to the standby mode, and is different from the first monitoring time period.

Then, the power supply controller 506 configures the timer controller 402 such that the operation of the timer function to be executed when the power state-shifting process is not completed within the monitoring time period is to output a reset signal (step S704), and thus sets the timer 403.

Then, the power supply controller 506 starts the activation process (step S705), and causes the timer 403 to start counting. The power supply controller 506 determines whether or not the activation process has been normally completed (step S706).

If it is determined in the step S706 that the activation process has been normally completed (YES to the step S706), the power supply controller 506 causes the timer 403 to stop counting, and clear the count value (step S711), followed by terminating the present process. At this time, the power supply controller 506 causes the power state-holding section 404 to store information on the power supply state of the controller 202, i.e. the fact that it is the standby mode.

On the other hand, if it is determined in the step S706 that the activation process has not been normally completed (NO to the step S706), the power supply controller 506 determines whether or not the count value counted by the timer 403 indicates that the monitoring time period elapsed (step S707).

If it is determined in the step S707 that the monitoring time period has not elapsed (NO to the step S707), the power supply controller 506 returns to the step S706. On the other hand, if it is determined in the step S707 that the monitoring time period has elapsed (YES to the step S707), the timer 403 outputs the reset signal for resetting the controller 202, to the reset circuit 331 (step S708), followed by terminating the present process. When the monitoring time period has elapsed as mentioned above, it is judged that the software is not normally operating, and hence resetting of the controller 202 is performed by the fail-safe function.

In the shift-to-power-on state process described as above with reference to FIG. 7, in the case where the type of the user's operation is the short press in the second power state (quick activation standby state), the monitoring time period is set to the first monitoring time period, set in advance, and the reset signal output is set to be executed for resetting the main control unit. Further, in the case where the type of user's operation is the short press in the power-off state, the monitoring time period is set to the second monitoring time period, set in advance, which is different from the first monitoring time period, and the reset signal output is set to be executed for resetting the main control unit. Further, the first and second monitoring time periods are determined by empirically measuring appropriate time periods in advance, and are stored in the ROM 302.

Figure 8:
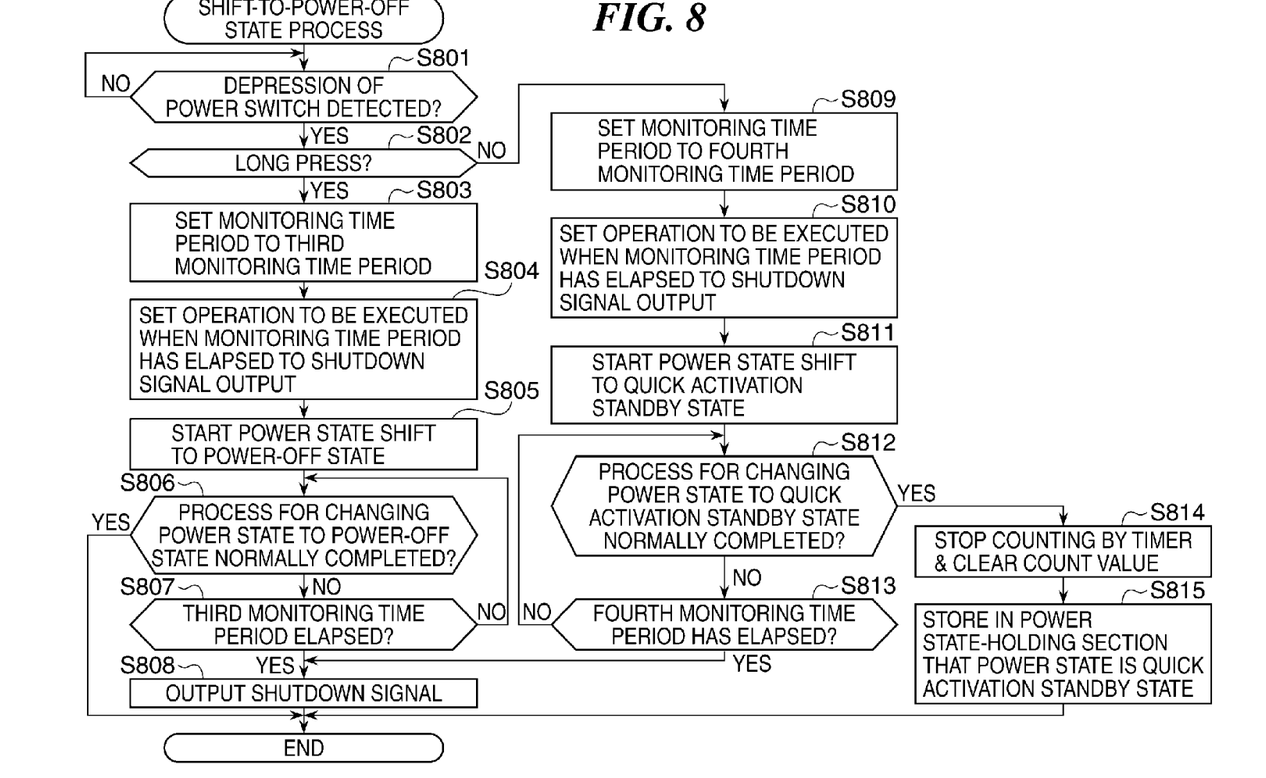
FIG. 8 is a flowchart of a shift-to-power-off state process executed by the CPU appearing in FIG. 2.

FIG. 8 is a flowchart of a shift-to-power-off state process executed by the CPU 301 appearing in FIG. 2.

Referring to FIG. 8, when depression of the power switch 350 is detected (YES to the step S801), the power supply controller 506 determines, based on the detected pressing time period of the power switch 350, whether the type of user's operation is the long press or the short press of the power switch (step S802). Whether to shift the power state to the quick activation standby state or the normal power-off state is determined depending on this pressing time period.

Note that whether or not to shift the power state to the quick activation standby state may be determined not only depending on the time period of depression of the power switch 350, but also, for example, depending on a condition of whether or not firmware update which requires reconfiguration of information stored in the RAM 340 has been executed, or whether or not a change in the network settings which requires resetting of the hardware has been made.

If it is determined in the step S802 that the type of user's operation is the long press of the power switch (YES to the step S802), the power supply controller 506 sets the monitoring time period as a setting for the timer 403 to a third monitoring time period via the timer controller 402 (step S803). The third monitoring time period is an appropriate monitoring time period for monitoring the process for changing the power state from the standby mode (power-on state) to the power-off state.

Next, the power supply controller 506 configures the timer controller 402 such that the operation of the timer function to be executed when the power state-shifting process is not completed within the monitoring time period is to output a shutdown signal (step S804), and thus sets the timer 403. Then, the power supply controller 506 starts the power state shift to the power-off state (step S805), and causes the timer 403 to start counting.

Then, the power supply controller 506 determines whether or not the process for changing the power state to the power-off state has been normally completed (step S806). If it is determined in the step S806 that the process for changing the power state to the power-off state has been normally completed (YES to the step S806), the present process is immediately terminated. In this case, the supply of power to the controller 202 is cut off by normal software processing.

On the other hand, if it is determined in the step S806 that the process for changing the power state to the power-off state has not been normally completed (NO to the step S806), the power supply controller 506 determines whether or not the count value counted by the timer 403 indicates that the third monitoring time period has elapsed (step S807).

If it is determined in the step S807 that the count value does not indicate that the third monitoring time period has elapsed (NO to the step S807), the power supply controller 506 returns to the step S806.

On the other hand, if it is determined in the step S807 that the count value indicates that the third monitoring time period has elapsed (YES to the step S807), the timer 403 outputs a shutdown signal for cutting off the supply of power to the controller 202 to the power supply control circuit 351 (step S808), followed by terminating the present process.

As describe above, when the software does not normally operate in the process for changing the power state to the power-off state, it is possible to forcibly shut down the image forming apparatus.

If it is determined in the step S802 that the type of user's operation is not the long press (NO to the step S802), the power supply controller 506 sets the monitoring time period as a setting for the timer 403 to a fourth monitoring time period (step S809). Here, the fourth monitoring time period is an appropriate monitoring time period for monitoring the process for changing the power state from the standby mode (power-on state) to the quick activation standby state, and is different from the third monitoring time period.

Next, the power supply controller 506 configures the timer controller 402 such that the operation of the timer function to be executed when the power state-shifting process is not completed within the monitoring time period is to output the shutdown signal (step S810), and thus sets the timer 403.

Then, the power supply controller 506 starts the process for changing the power state to the quick activation standby state (step S811), and causes the timer 403 to start counting.

Then, the power supply controller 506 determines whether or not the process for changing the power state to the quick activation standby state has been normally completed (step S812).

If it is determined in the step S812 that the process for changing the power state to the quick activation standby state has been normally completed (YES to the step S812), the power supply controller 506 causes the timer 403 to stop counting and clear the count value (step S814). Further, the power supply controller 506 causes the power state-holding section 404 to store information on the power supply state of the controller 202, i.e. the fact that it is the quick activation standby state (step S815), followed by terminating the present process.

On the other hand, if it is determined in the step S812 that the process for changing the power state to the quick activation standby state has not been normally completed (NO to the step S812), the power supply controller 506 determines whether or not the count value counted by the timer 403 indicates that the fourth monitoring time period has elapsed (step S813).

If it is determined in the step S813 that the count value indicates that the fourth monitoring time period has not elapsed (NO to the step S813), the process returns to the step S812.

On the other hand, if it is determined in the step S813 that the count value indicates that the fourth monitoring time period has elapsed (YES to the step S813), the power supply controller 506 proceeds to the step S808.

As described above, when the software does not normally operate in the process for changing the power state to the quick activation standby state, it is possible to forcibly shut down the image forming apparatus by fail-safe function, and the activation process can be started when the user depresses the power switch 350 next time.

In the shift-to-power-off state process described above with reference to FIG. 8, when the power state is the first power state or the second power state, and the type of user's operation is the long press of the power switch, the monitoring time period is set to the third monitoring time period, set in advance, and it is set that a shutdown signal for cutting off the supply of power to the main control unit is output. Further, when the power state is the first power state, and the type of user's operation is the short press of the power switch, the monitoring time period is set to the fourth monitoring time period, set in advance, and it is set that the operation for cutting off the supply of power to the main control unit is to be executed. Further, the third monitoring time period and the fourth monitoring time period are determined by empirically measuring appropriate time periods in advance, and are stored in the ROM 302.

According to the above-described embodiment, by deciding a monitoring time period, set in advance, according to the type of user's operation and the power state, the fail-safe function is more quickly executed than in a case where the same monitoring time period is always set.

As described above, according to the present invention, in the image forming apparatus, it is possible to set the timer used for monitoring the power state-shifting process to an appropriate monitoring time period according to a time period over which the power switch is depressed and a power supply state of the controller.

Further, it is possible to select, as an operation to be performed when the count value of the timer used for monitoring the power state-shifting process indicates that the monitoring time period has elapsed, whether to output a shutdown signal or whether to output a forcible reset signal, according to a time period of depression of the power switch and a power supply state of the controller.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-228803, filed Oct. 16, 2012, which is hereby incorporated by reference herein in its entirety.

What is claimed is:

1. An image forming apparatus that is capable of operating in a plurality of power states which are different in power consumption, and includes a switch operated by a user so as to switch an actual power state between the plurality of power states, comprising:
- a main control unit configured to control the image forming apparatus;
- a power supply control unit configured to control supply of power to said main control unit;
- a reset unit configured to reset said main control unit;
- a deciding unit configured to decide, when the switch is operated by the user, a monitoring time period, set in advance, according to a type of user's operation and the actual power state;
- a setting unit configured to set, according to the type of user's operation and the actual power state, one of respective operations to be executed when the monitoring time period has elapsed, for causing said main control unit to interrupt the supply of power to said main control unit and for causing said reset unit to reset said main control unit; and
- an operation execution unit configured to execute the operation set by said setting unit when the monitoring time period decided by said deciding unit has elapsed from when the switch is operated by the user, in a state executing a process started in response to operation of the switch by the user, for changing the actual power state.

2. The image forming apparatus according to claim 1, wherein the plurality of power states include a first power state, a second power state which is lower in power consumption than the first power state, and a power-off state in which the supply of power is cut off, and the type of user's operation includes a short press for depressing the switch for a shorter time period than a predetermined operation time period, and a long press for depressing the switch for a time period not shorter than the predetermined operation time period.

3. The image forming apparatus according to claim 2, wherein when the actual power state is the second power state, and the type of user's operation is the short press,
- said deciding unit decides a first monitoring time period, set in advance, as the monitoring time period, and
- said setting unit sets the operation to be executed for causing said reset unit to reset said main control unit.

4. The image forming apparatus according to claim 2, wherein when the actual power state is the power-off state, and the type of user's operation is the short press,
- said deciding unit decides a second monitoring time period, set in advance, which is different from the first monitoring time period, as the monitoring time period, and
- said setting unit sets the operation to be executed for causing said reset unit to reset said main control unit.

5. The image forming apparatus according to claim 2, wherein when the actual power state is the first power state or the second power state, and the type of user's operation is the long press,
- said deciding unit decides a third monitoring time period, set in advance, as the monitoring time period, and
- said setting unit sets the operation to be executed for causing said main control unit to interrupt the supply of power to said main control unit.

6. The image forming apparatus according to claim 2, wherein when the actual power state is the first power state, and the type of user's operation is the short press,
- said deciding unit decides a fourth monitoring time period, set in advance, as the monitoring time period, and
- said setting unit sets the operation to be executed for causing said main control unit to interrupt the supply of power to said main control unit.

7. A method of controlling an image forming apparatus that is capable of operating in a plurality of power states which are different in power consumption, and includes a switch operated by a user so as to switch an actual power state between the plurality of power states, a main control unit configured to control the image forming apparatus, a power supply control unit configured to control supply of power to the main control unit, and a reset unit configured to reset the main control unit, the method comprising:
- deciding, when the switch is operated by the user, a monitoring time period, set in advance, according to a type of user's operation and the actual power state;
- setting, according to the type of user's operation and the actual power state, one of respective operations to be executed when the monitoring time period has elapsed, for causing the main control unit to interrupt the supply of power to the main control unit and for causing the reset unit to reset the main control unit; and
- executing, by the main control unit, the operation set by said setting when the monitoring time period decided by said deciding has elapsed from when the switch is operated by the user, in a state executing a process started in response to operation of the switch by the user, for changing the actual power state.

8. The method according to claim 7, wherein the plurality of power states include a first power state, a second power state which is lower in power consumption than the first power state, and a power-off state in which the supply of power is cut off, and the type of user's operation includes a short press for depressing the switch for a shorter time period than a predetermined operation time period, and a long press for depressing the switch for a time period not shorter than the predetermined operation time period.

9. The method according to claim 8, wherein when the actual power state is the second power state, and the type of user's operation is the short press,
- said deciding includes deciding a first monitoring time period, set in advance, as the monitoring time period, and
- said setting includes setting the operation to be executed for causing the reset unit to reset the main control unit.

10. The method according to claim 8, wherein when the actual power state is the power-off state, and the type of user's operation is the short press,
- said deciding includes deciding a second monitoring time period, set in advance, which is different from the first monitoring time period, as the monitoring time period, and
- said setting includes setting the operation to be executed for causing the reset unit to reset the main control unit.

11. The method according to claim 8, wherein when the actual power state is the first power state or the second power state, and the type of user's operation is the long press,
- said deciding includes deciding a third monitoring time period, set in advance, as the monitoring time period, and said setting includes setting the operation to be executed for causing the main control unit to interrupt the supply of power to the main control unit.

12. The method according to claim 8, wherein when the actual power state is the first power state, and the type of user's operation is the short press, said deciding includes deciding a fourth monitoring time period, set in advance, as the monitoring time period, and said setting includes setting the operation to be executed for causing the main control unit to interrupt the supply of power to the main control unit.

13. A non-transitory computer-readable storage medium storing a computer-executable control program for causing a computer to execute a method of controlling an image forming apparatus that is capable of operating in a plurality of power states which are different in power consumption, and includes a switch operated by a user so as to switch an actual power state between the plurality of power states, a main control unit configured to control the image forming apparatus, a power supply control unit configured to control supply of power to the main control unit, and a reset unit configured to reset the main control unit, wherein the method comprises:

deciding, when the switch is operated by the user, a monitoring time period, set in advance, according to a type of user's operation and the actual power state;

setting, according to the type of user's operation and the actual power state, one of respective operations to be executed when the monitoring time period has elapsed, for causing the main control unit to interrupt the supply of power to the main control unit and for causing the reset unit to reset the main control unit; and executing the operation set by said setting when the monitoring time period decided by said deciding has elapsed from when the switch is operated by the user, in a state executing a process started in response to operation of the switch by the user, for changing the actual power state.

14. An image forming apparatus that is capable of operating in a first power state and a second power state which is less in power consumption than the first power state, comprising:

a power switch configured to be operated by a user;

a control unit configured to cause, in a case where the user performs a first type operation to the power switch when the image forming apparatus operates in the second power state, the image forming apparatus to return from the second power state to the first power state, and cause, in a case where the user performs a second type operation to the power switch when the image forming apparatus operates in the second power state, the image forming apparatus to shift from the second power state to a power-off state;

a reset unit configured to reset the control unit; and a power control unit configured to control power supply to the control unit, wherein, in a case where the user performs the first type operation to the power switch when the image forming apparatus operates in the second power state, if the image forming apparatus does not return from the second power state to the first power state within a predetermined time period, the reset unit resets the control unit, and in a case where the user performs the second type operation to the power switch when the image forming apparatus operates in the second power state, if the image forming apparatus does not shift from the second power state to the power-off state within a predetermined time period, the power control unit stops power supply to the control unit.

15. The image forming apparatus according to claim 14, further comprising a network controller configured to receive data through a network from an external apparatus, wherein the power control unit stops power supply to the network controller.

16. The image forming apparatus according to claim 14, wherein the power switch is a tactile switch.

17. The image forming apparatus according to claim 14, further comprising a printing unit configured to print image on a sheet.

* * * * *